United States Patent [19]

Dumont

[11] 4,127,197
[45] Nov. 28, 1978

[54] DUAL-PURPOSE SKYLINE LOG-YARDING CARRIAGE

[76] Inventor: Eston A. Dumont, Rte. 1, Box 142, Glide, Oreg. 97443

[21] Appl. No.: 780,855

[22] Filed: Mar. 24, 1977

[51] Int. Cl.$^2$ .............................................. B66C 21/00
[52] U.S. Cl. ..................................... 212/122; 212/89; 254/184
[58] Field of Search ..................................... 212/83–89, 212/70, 118, 122, 98, 77, 78; 254/184

[56] References Cited

U.S. PATENT DOCUMENTS

| | | | |
|---|---|---|---|
| 3,523,615 | 8/1970 | Anderson et al. | 212/98 |
| 3,718,262 | 2/1973 | Lysons et al. | 212/122 |
| 3,776,390 | 12/1973 | Junes et al. | 254/184 |

*Primary Examiner*—Lawrence J. Oresky

[57] ABSTRACT

A skyline log-yarding carriage has three drums including an in-haul drum, a haul-back drum, and a drop line drum, all interconnected for rotation in the same direction at the same time. The carriage also has a drum brake and a cable clamp, the latter for holding the carriage stationary on the skyline. The brake and clamp are applied alternately by remote control. The in-haul and haul-back drums are positioned at opposite ends of the carriage above the level of the drop-line drum. However, the haul-back drum is located slightly below the level of the in-haul drum so that a slack-pull line can pass from the underside of the haul-back drum forwardly from the carriage to a powered yarder drum in a cable passage thus created between the in-haul and drop-line drums for gravity or "shotgun" yarding. In gravity yarding the slack-pull line is used to lower the drop-line under power for attachment to a load while the brake is released and the clamp applied. The carriage can also be used for conventional skyline yarding by replacing the slack-pull cable with a haulback cable which extends from the upper side of the haul-back drum rearwardly from the carriage to a tail block anchored in the woods and then forwardly to a powered yarder drum for use in pulling the carriage along the skyline away from the yarder. In another embodiment the three carriage drums are fixed side by side to a common rotatable shaft.

9 Claims, 4 Drawing Figures

DUAL-PURPOSE SKYLINE LOG-YARDING CARRIAGE

BACKGROUND OF THE INVENTION

1. Field of the Invention

The present invention relates to skyline logging carriage and systems used in yarding logs.

2. Description of the Prior Art

In one known skyline yarding system, an overhead carriage is suspended for travel along a fixed skyline between a cutting site in the woods where the timber is felled and bucked into logs, and a log landing or collection point where the cut logs are loaded, typically onto trucks, for transportation to a sawmill. The skyline carriage is pulled along the skyline from the woods to the landing by an in-haul cable wrapped about a carriage drum at one end and, at the other end about a powered winch drum on a yarding machine at the landing. The carriage is pulled back to the woods by a haulback cable wrapped on a second carriage drum at one end and about a second powered winch drum on the yarder at the opposite end. The haulback cable passes from the carriage rearwardly to a tail block in the woods and then forwardly to its winch drum. A brake is applied to the carriage drums to enable carriage travel. A drop line is suspended from a third carriage drum interconnected to the other two such drums, and choker cables are attached to the lower end of the drop line for connecting logs to the drop line so that they can be carried or skidded from the woods to the landing with the carriage. This is a conventional three-drum skyline yarding system.

Where the landing is uphill from the cutting site, a so-called "shotgun" or gravity yarding system can be used. In this system the haulback line and its drum can be eliminated because gravity is used to propel the carriage along the skyline from the landing back to the woods.

Heretofore gravity skyline yarding could not be successfully carried out using a conventional three-drum carriage as described because the positioning of the carriage drums interfered with the desired rigging of the carriage drum cables for this purpose. Furthermore, such carriages in the past have been equipped with cable clamps effective to hold the carriage against movement along the skyline in only a forward direction, whereas in gravity yarding a clamp must also be capable of holding the carriage against movement in the opposite, downhill direction. Consequently, in the past special shotgun carriages have been used for gravity yarding. Such shotgun carriages have relied on gravity for lowering the dropline for attachment to and releasing a load, and gravity is sometimes unreliable for this purpose.

However, one desirable feature of a gravity skyline yarding system is that it is much easier and faster to set up, as will be apparent from a comparison of FIGS. 1 and 2. Since there is no haulback line, no tail blocks are required in the woods for the haulback line. Only the skyline needs to be anchored in the woods.

Skyline carriages are of many types and varieties. Typical skyline carriages of the prior art are shown in, for example, U.S. Pat. Nos. 3,776,390 (three-drum); 3,844,419 (no carriage drums); Re. 27,621; 3,083,839; 3,712,478; 3,718,262; 3,531,000; 3,863,774; and 3,247,933. None of them, however, are suitable for use in both gravity yarding and conventional three-drum yarding as described. Accordingly, there is a need for a skyline carriage suitable for use both in conventional three-drum skyline yarding and in gravity skyline yarding.

SUMMARY OF THE INVENTION

The present invention is a three-drum skyline carriage that can be used alternatively for either conventional skyline yarding in which the carriage is pulled under power in both directions along the skyline or gravity skyline yarding in which gravity is used to move the carriage along the skyline in one direction.

The carriage of the invention features a drum arrangement which enables the haulback drum to receive a haulback cable which passes from the carriage rearwardly for conventional yarding or receives a slack-pull cable which passes forwardly through and from the carriage to a powered yarder winch drum without conflicting with the other two carriage drums and their cables whereby the slack-pull line can be used to lower the dropline under power.

The carriage of the invention also features a drum brake and a cable clamp, the operations of which are coordinated so that when the drum brake is applied, the cable clamp is released and vice versa.

Another feature of the carriage of the invention is a two-directional cable clamp which is equally effective to resist movement of the carriage in both directions along the skyline.

From the foregoing it will be apparent that the primary object of the invention is to provide a dual-purpose skyline carriage for use alternatively in conventional skyline yarding or in gravity skyline yarding, without modification of the carriage structure itself.

Another object of the invention is to provide a dual-purpose carriage as aforesaid which can be rigged for conventional skyline yarding or gravity yarding simply by changing the wrap of the cable on the haulback drum.

Still another important object of the invention is to provide a skyline carriage as aforesaid capable of both raising and lowering the dropline under power with the carriage rigged in either its conventional mode or its gravity mode of operation.

The foregoing and other objects, features and advantages of the present invention will become more apparent from the following detailed description which proceeds with reference to the accompanying drawings.

DETAILED DESCRIPTION OF A PREFERRED EMBODIMENT

General Assembly

Figure 1:
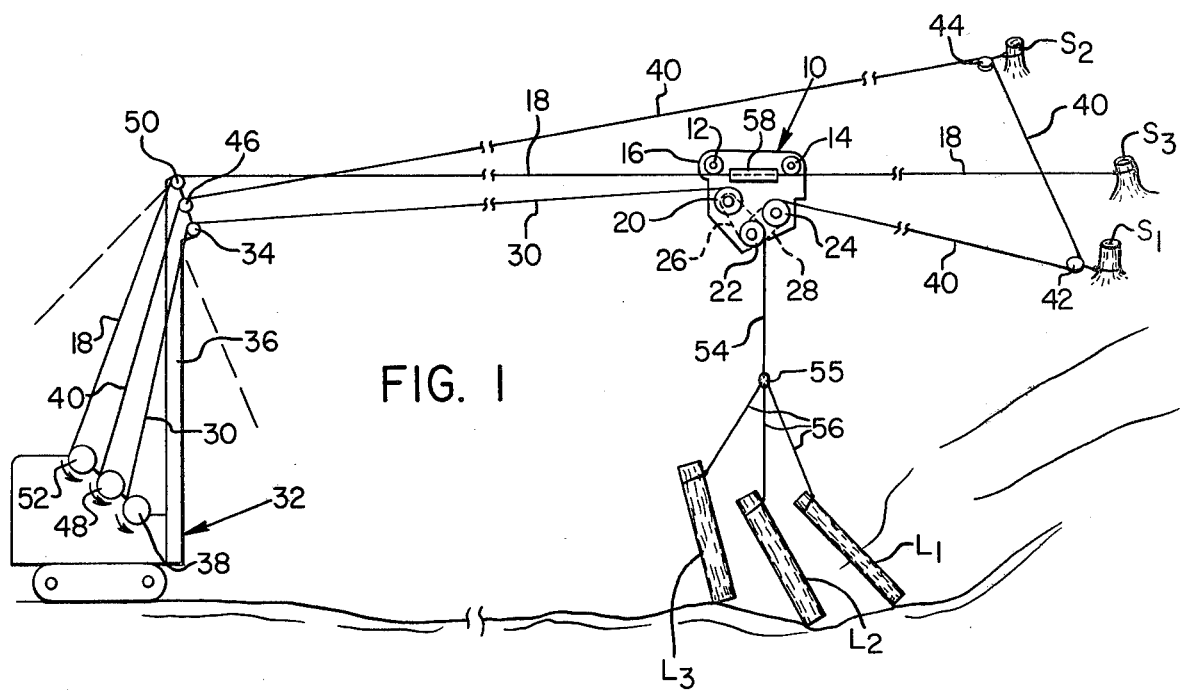
FIG. 1 is a schematic view of a conventional skyline yarding system using a skyline in accordance with the invention.
Figure 2:
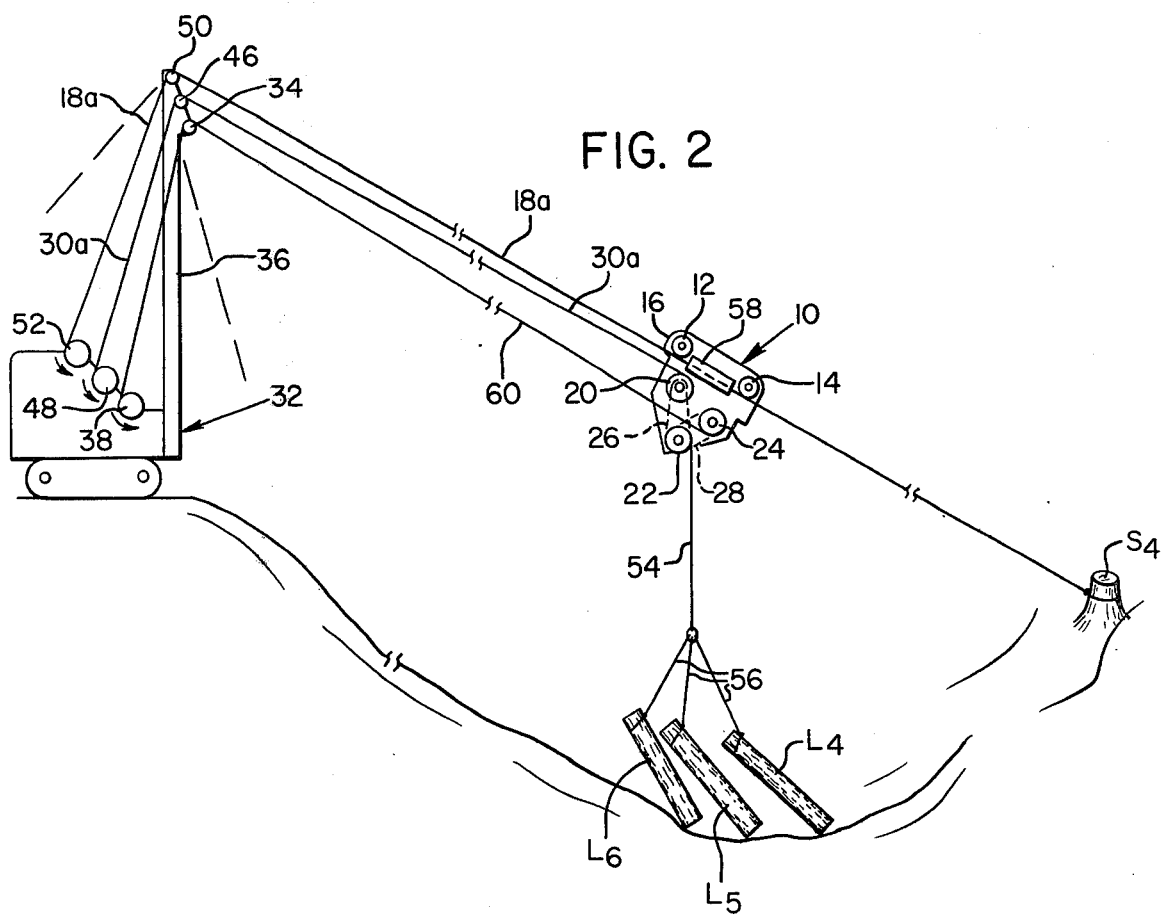
FIG. 2 is a schematic view of a gravity or shotgun skyline yarding system using the same carriage as that shown in FIG. 1.

Referring first to FIGS. 1 and 2, a skyline carriage 10 has sheave wheels 12, 14 at opposite upper corners of a carriage housing 16 for suspending the carriage assembly on a skyline cable 18 for travel in opposite directions along such cable. The carriage also includes three drums, including an in-haul drum 20, a dropline drum 22, and a haulback or slack-pull drum 24, each rotatably mounted in the carriage housing for rotation about their respective axes. The three carriage drums are drivingly interconnected by interconnecting means comprising endless roller chain 26 between the in-haul and dropline drums and endless roller chain 28 between the dropline and haulback drums so that rotation of one drum in a given direction causes simultaneous rotation of the other two drums in the same direction.

An in-haul cable 30 passes from the upper side of in-haul drum 20 forwardly from the carriage to a yarding machine or vehicle 32, commonly called a yarder and comprising a power winching means. In-haul cable 30 passes about a sheave 34 at an upper portion of a yarder mast 36 and thence downwardly to a powered yarder winch drum 38 which can be rotated under only in a counterclockwise direction of rotation as viewed in FIG. 1.

A haulback cable 40 passes from the upper side of haulback drum 24 rearwardly from the carriage about first and second tail blocks 42, 44 anchored to stumps S-1, S-2 in the woods and then forwardly to yarder 32. There the haulback line passes over a sheave 46 at the upper end of the yarder mast 36 and then downwardly to a second powered winch drum 48 which, like yarder drum 38, is powered only in the counterclockwise direction of rotation as viewed in FIG. 1. Both drums, however, can be free-wheeled or braked, as desired, in the opposite direction.

Skyline 18 is anchored at one end in the woods to, for example, a stump S-3. At its opposite end the skyline passes over a third sheave 50 at the upper end of yarder mast 36 and then downwardly to a third yarder drum 52 which, like the others, is shown as being powered for rotation only in a counterclockwise direction.

A dropline 54 is stored on carriage dropline drum 22. One end portion of the dropline can be lowered to or raised from ground level by rotating drum 22. The lower end of the dropline has a fitting 55 for attachment of choker cables 56 which are adapted to be wrapped about logs L-1, L-2, L-3, whereby the logs can be lifted by the dropline and then carried or skidded to the landing via the skyline carriage. The dropline and choker cables are conventional and commonly used in logging operations, so need not be described further.

A drum brake on carriage 10 (FIG. 3) is operable to brake one drum and thereby prevent rotation of all three drums. Similarly, the carriage is equipped with a cable clamp 58 for selectively clamping the carriage to skyline 18 to prevent its movement along the skyline in either direction. An ideal clamp for this purpose is the self-energizing, wedge-activated cable clamp described and claimed in my copending application Ser. No. 780,751, filed Mar. 24, 1977, and entitled Cable Clamp.

The rigging arrangement just described is conventional for a skyline yarding system using a three-drum carriage as described.

Conventional Skyline Yarding

In practice logs L-1, L-2 and L-3 are shown in FIG. 1, as just having been attached to choker cables 56. The choker cables and connected logs are in the process of being raised from the ground by dropline 54 with cable clamp 58 applied to hold the skyline carriage against movement on skyline 18. At the same time the carriage drum brake is released so that the three carriage drums 20, 22 and 24 are free to rotate. They are in fact rotated to raise dropline 54 by using winch drum 38 to apply tension to in-haul cable 30. At the same time the brake on winch drum 48 is released to slack haulback line 40. This slack is taken up by carriage drum 24 because of the rotation of drum 24 induced by rotation of in-haul drum 20. Because all three carriage drums, being interconnected, rotate at the same time, dropline 54 is picked up by dropline drum 22. When the logs L-1 have been raised to a sufficient height to clear the ground between the pickup point and the landing, the carriage drum brake is applied to hold the logs above ground, and carriage clamp 58 is released while yarder drum 38 continues to wind in the in-haul cable under power, pulling carriage 10 to the landing.

At the landing, the winch drum brakes are applied to both drums 38 and 48 to stop the movement of carriage 10 along the skyline. Then cable clamp 58 is applied to hold the carriage on the skyline. At the same time the carriage brake and the brakes on yarder drums 38 and 48 are released to lower dropline 54 and the connected turn of logs to ground where they are released from chokers 56. If desired, drop line 54 can be lowered slowly by slipping the brake on winch drum 38.

After the logs are unloaded, the dropline is raised above ground again by powering winch drum 38 to tension in-haul cable 30 while the carriage brake and brake on winch drum 48 are released. When the dropline is at the desired elevation above ground, the carriage drum brake is applied and cable clamp 58 is released while power is applied to winch drum 48 to tension haulback cable 40 and in-haul cable 30 is slacked by free-wheeling winch drum 38 to pull the carriage back to the woods.

When the carriage is at a desired location in the woods to pick up another turn of logs, the winch drums 38, 48 are braked to stop the carriage. Then cable clamp 58 is applied and the carriage drum brake released. Thereafter power is applied to winch drum 48 to tension haulback cable 40 while in-haul cable 30 is slacked, causing rotation of the three carriage drums in a clockwise direction in FIG. 1. As a result, dropline 54 is lowered under power until it reaches ground level so that another turn of logs can be attached to it. This completes one yarding cycle.

Gravity or Shotgun Skyline Yarding

The gravity yarding system of FIG. 2 differs from the conventional three-drum skyline yarding system described with reference to FIG. 1 in that the powered haulback line 40 is eliminated in the gravity system. Instead, gravity is used to propel the carriage 10 along skyline cable 18a from the landing where yarder 32 is located back to a log pickup point in the woods. Only the fixed skyline cable 18a in FIG. 2 extends beyond the carriage itself to an anchor point in the woods, such cable being shown anchored to a stump S-4 on a hillside. The other end of the skyline cable is fixed to the same yarder 32 in the same manner as described in FIG. 1.

In the gravity yarding system of FIG. 2, the same carriage 10 is used as described in FIG. 1. An in-haul cable 30a extends from the upper side of in-haul drum 20 on the carriage forwardly and about sheave 46 of the yarder mast down to the winch drum 48. Dropline 54 extends downwardly from dropline drum 22 of the carriage as before for connection to choker cables 56 for picking up a turn of logs L-4, L-5, L-6. The only essential rigging change from that shown in FIG. 1 for gravity yarding is the use of a slack-pull cable 60 on the haulback drum 24 instead of haulback cable 40. The slack-pull cable extends forwardly from the underside of haulback drum 24 through the carriage to the yarder 32 where it passes over mast sheave 34 and downwardly to winch drum 38.

In moving the carriage 10 to the landing with a turn of logs, the gravity system is operated in a manner similar to the conventional skyline system previously described. With the carriage clamp 58 applied and the carriage drum brake released, tension is applied to in-haul cable 30a to rotate the three carriage drums counterclockwise, thereby causing dropline drum 22 to raise dropline cable 54 and its connected load above ground level. The carriage drum brake is then applied, and the carriage clamp released while tension continues to be applied to in-haul cable 30a, pulling the carriage to the landing. At the landing, the winch drums 38, 48 are braked to stop carriage travel. Then carriage clamp 58 is applied and the carriage and winch drum brakes released to lower the logs to the ground at the landing for release.

With the logs unloaded, dropline 54 is elevated by again tensioning in-haul cable 30a through winch drum 48 while winch drum 38 is free-wheeled. With the dropline elevated, the brakes on both winch drums 38 and 48 are released while the carriage brake is applied and the cable clamp 58 released; whereby gravity causes the carriage to run downhill along skyline 18a back to the woods for another turn of logs. At the desired location along the skyline, the brakes on winch drums 38 and 48 are applied to stop carriage travel. When the carriage is stopped, cable clamp 58 is applied and the carriage drum brake released while slack-pull cable is tensioned by powering winch drum 38 to rotate all of the carriage drums clockwise. Clockwise rotation of dropline drum 22 under power lowers dropline 54 to ground level to pick up another turn of logs, after which the yarding cycle is repeated.

Of course, in gravity logging with the described carriage, winch drum 38 is powered at the same time that winch drum 48 is powered to prevent slack from developing in slack-pull cable 60 during travel of the carriage to the landing.

Skyline Carriage Details

Figure 3:
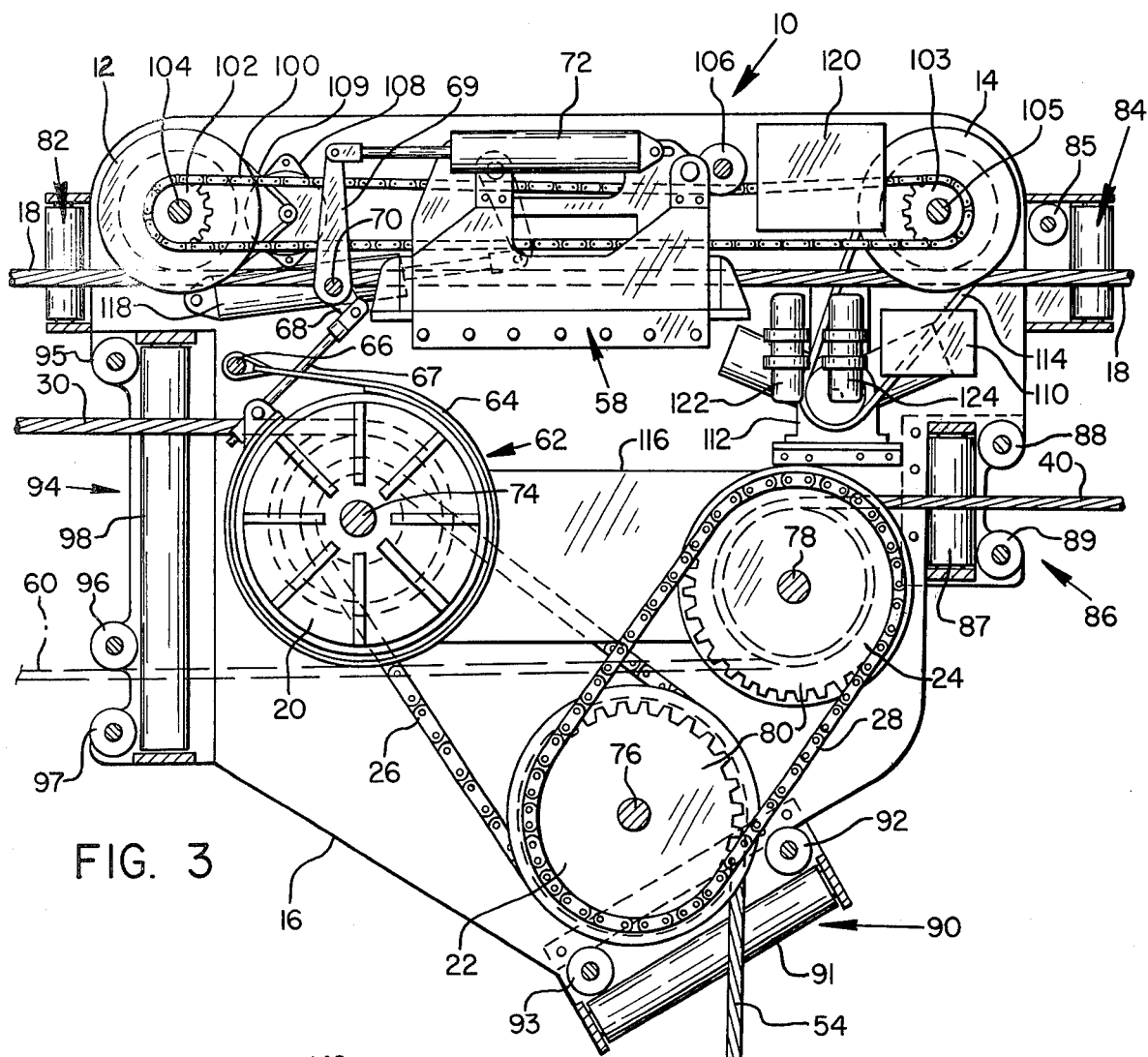
FIG. 3 is an enlarged side view of the carriage shown in FIGS. 1 and 2 with one sidewall of the carriage housing removed to reveal internal details.

Referring to FIG. 3, a preferred embodiment of the carriage 10 previously described includes a drum brake 62 with a brake band 64 encircling a brake drum surface of carriage drum 20. The band is anchored at one end to a pin 66 fixed to carriage housing 16. The opposite end of the band is connected by a brake linkage, including rod 67 and levers 68, 69 pivoted to a shaft 70, to a double acting air cylinder 72. Extension of cylinder 72 applies the brake band to drum 20, thereby preventing rotation of all three carriage drums 20, 22 and 24. Retraction of air cylinder 72 releases the brake, freeing the three drums for rotation about their respective transverse axes.

The three drums 20, 22, 24 are mounted for rotation on separate shafts 74, 76, 78 extending transversely between and supported by the opposite sidewalls of carriage housing 16, only one of which is shown. These three drum shafts are spaced apart vertically as well as horizontally to position the drums in a compact, generally triangular arrangement. The shaft 78 of haulback drum 24 is positioned at a level slightly below shaft 74 of the in-haul drum and rearwardly thereof. Shaft 76 for dropline drum 22 is positioned at a level considerably below both shafts 74 and 78 and horizontally therebetween. These three transverse drum shafts are so positioned as to create a cable passage or space in the zone within the carriage between the lowermost extremity of in-haul drum 20 and the uppermost extremity of dropline drum 22. Thus when slack-pull cable 60 passes forwardly through the carriage from the underside of haulback drum 24 generally parallel to the skyline 18 for use in gravity yarding, it clears both the dropline drum and the in-haul drum and does not conflict with or rub against either such drums or their cables. This arrangement of three carriage drums also enables the haulback drum 24 to store a haulback line 40 which passes from the upper side of such drum rearwardly from the carriage to the tail blocks for use in conventional skyline yarding as described with respect to FIG. 1.

The two roller chains 26, 28 providing a flexible endless interconnecting means between the carriage drums are trained about sprockets 80 carried by each drum. The sprocket and chain drive between drums 20 and 22 provide a two-to-one reduction between the in-haul drum 20 and dropline drum 22, whereas the drive ratio between the dropline drum 22 and haulback drum 24 is one-to-one. The two-to-one reduction requires one-half the tension on in-haul cable 30 that would otherwise be required to lift a load attached to dropline 54 if the drive ratio were one-to-one between such two drums. The reduced tension in line 30 required to lift a turn of logs reduces the maximum clamping force required by cable clamp 58 to hold the carriage against movement along skyline 18 during the log-lifting operation.

A system of fairleads is provided on the carriage for guiding the various cables from the carriage. Such system includes a front skyline fairlead 82 having two vertical rollers on opposite sides of skyline 18 at the forward end of the carriage. A rear skyline fairlead 84 includes another pair of vertical rollers on opposite sides of the skyline at the rear end of the carriage and a transverse roller 85 above the skyline. A haulback fairlead 86 for haulback cable 40 includes a pair of vertical rollers 87 on opposite sides of the haulback cable and a pair of transverse rollers 88, 89, one above and one below the haulback cable.

A dropline fairlead assembly 90 for dropline 54 is offset rearwardly from a vertical plane through the axis of dropline drum 22 and is tilted upwardly and rearwardly from its lowermost forward end. This fairlead includes a pair of inclined rollers 91 on one set of opposite sides of dropline 54, and a pair of transverse rollers 92, 93 normal to the first set of rollers 91 on a second set of opposite sides of the dropline cable. This rearwardly offset and upwardly tilted position of the fairlead provides a more natural guiding action for the dropline when the skyline extends at a steep slope downwardly from the landing and when there is low ground clearance between the log pickup point and the landing so that the logs might have to be skidded partway to the landing.

A combined in-haul and slack-pull fairlead assembly 94 is provided along the front of the carriage for accommodating both in-haul line 30 and slack-pull line 60 when the latter is used. Such assembly includes three transverse vertically spaced rollers 95, 96, 97 and two long vertical rollers 98, only one being shown, extending the full length of the fairlead assembly on opposite sides of both slack-pull line 60 and in-haul line 30. When the slack-pull line is used, it extends between the two lower transverse rollers 96, 97, whereas in-haul line 30 extends between the upper two transverse rollers 95, 96.

An endless roller chain 100 is trained about sprockets 102, 103 on shafts 104, 105 which carry skyline sheaves 12, 14 to provide a positive driving connection between the two sheaves. Therefore, when the carriage is pulled in either direction along the cable, both sheaves are caused to rotate in the same direction at a synchronized speed. A chain-tensioning roller 106 is positioned between the two sheaves. Rotation of skyline sheave 12 drives an alternator 108 through a belt 109 for charging an electrical storage battery 110 on the carriage. Similarly rotation of rear skyline sheave 14 drives an air compressor 112 through the endless belt 114 for charging an air accumulator or supply tank 116. Air tank 116 provides the necessary compressed air supply for operating brake cylinder 72 and a second double-acting air cylinder 118 for activating cable clamp 58.

The source of electricity on the carriage is needed to power a radio receiver 120 and electrically operated air valves 122, 124. Signals from the radio receiver control the positioning of the air valves, which in turn control the operation of the brake and clamp cylinders. More specifically, when a radio signal is received by the radio receiver 120 from a remote radio transmitter on the ground, one valve 122 is positioned to extend brake cylinder 72 to apply the drum brakes while simultaneously the other air valve 124 is positioned to retract clamp cylinder 118 to release the cable clamp from skyline 18. A second signal received and transmitted by the radio receiver 120 to the air valves has the reverse effect, simultaneously releasing the drum brake and applying the cable clamp.

SUMMARY OF OPERATION

The functioning of the various components of the carriage are as previously described regardless of whether the carriage is rigged for conventional skyline yarding as shown, using the haulback cable 40, or rigged for gravity skyline yarding using the alternative slack-pull cable 60. In either case, the drum brake and cable clamp are applied and released alternately as described. In this regard it is important that the cable clamp 58 have the capability of clamping the skyline carriage to the skyline 18 to resist movement of the carriage in both directions along the skyline when the clamp is applied. This feature enables lowering dropline 54 under power using either haulback cable 40 or slack-pull cable 60 while clamp 58 is applied and drum brake 62 is released. It also enables raising dropline 54 under load using in-haul cable 30, again with the cable clamp 58 applied and the drum brakes released.

Modified Skyline Carriages

Other arrangements of the three carriage drums on the skyline carriage are possible to avoid conflict between the drums and their respective cables using either conventional or gravity yarding systems. For example, the three drums could be stacked and spaced apart vertically, one above the other on the carriage with the in-haul drum on top, the haulback drum in the middle, and the dropline drum lowermost. However, such an arrangement would require an abnormally long carriage which would be unduly heavy and awkward, and might not provide sufficient ground clearance in certain applications. However, it would be an operable embodiment.

Figure 4:
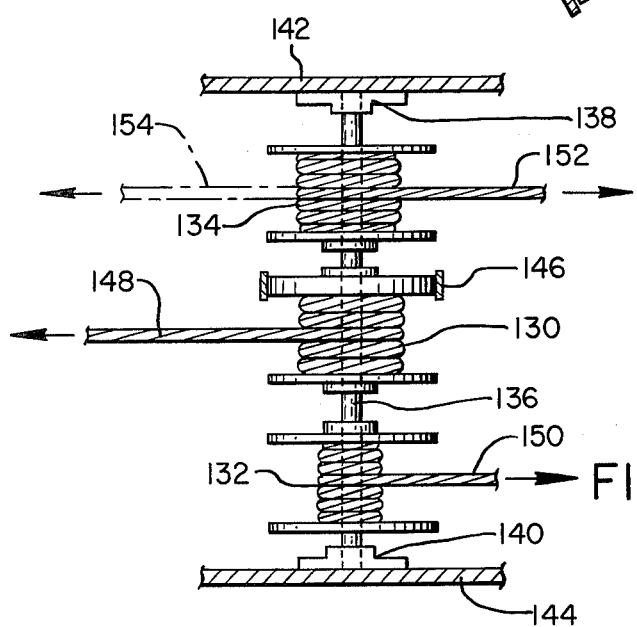
FIG. 4 is a partial schematic plan view of a modified form of skyline carriage of the invention.

Another modified carriage embodiment is shown schematically in FIG. 4. In this embodiment, the three carriage drums, including in-haul drum 130, dropline drum 132 and haulback drum 134, are mounted side by side on a common transverse shaft 136. All three drums are fixed to the shaft, and the shaft is journaled at its opposite ends for rotation in bearings 138, 140 carried by opposite side plates 142, 144 of the carriage housing so that all three drums rotate together.

A drum brake 146 is applied to one drum, such as in-haul drum 130 to prevent rotation of all three drums when required. An in-haul cable 148 extends forwardly to the yarder from drum 130, and a dropline cable 150 extends downwardly from drum 132. Haul-back drum 134 can be provided either with a haulback cable 152 passing rearwardly from its upper side for conventional yarding, or alternatively with a slack-pull cable 154 passing forwardly from its underside for gravity yarding. The effective diameter of dropline drum 132 can be less than the effective diameter of in-haul drum 130 to reduce the tension on in-haul cable 148 that would be required to lift a load attached to dropline 150.

The carriage of FIG. 4 would be equipped with all of the other components of the carriage of FIG. 3 as previously described.

Having illustrated and described the principles of my invention in a preferred embodiment and several suggested alternative embodiments, it should be apparent to persons skilled in the art that such embodiments may be modified without departing from such principles. I claim as my invention all such modifications as come within the true spirit and scope of the following claims.

I claim:

1. A skyline carriage for movement along a fixed skyline cable under the influence of a power winching means in a gravity or non-gravity skyline yarding system comprising:
    at least three cable drums on said carriage, each storing a length of cable,
    shaft means on said carriage wherein said shaft means comprises three separate parallel transverse shafts, each mounted at a different vertical level on said carriage, each of said transverse shafts mounting a different one of said three drums and mounting said three drums in positions such that a first said drum can pay out and take in cable in a direction forwardly of said carriage generally parallel to said skyline and toward said power winching means, a second of said drums can pay out and take in cable in a direction generally downwardly from said carriage, and a third of said drums can pay out and take in cable alternatively either in a direction forwardly or in a direction rearwardly from said carriage generally parallel to said skyline, with all three drums operating as described simultaneously without conflict of their respective cables, interconnecting means on said carriage drivingly interconnecting all three said drums so that rotation of one of said three drums in either direction of rotation causes a corresponding rotation of the other two of said three drums in a corresponding direction of rotation, drum brake means on said carriage selectively operable to prevent rotation of all three said drums, and two-way cable clamp means on said carriage selectively operable to clamp said carriage to said skyline cable to prevent movement of said carriage in either direction along said skyline cable, the cable on said third drum when passing rearwardly from said carriage passing from the same one of the upper and lower sides of said third drum as the cable on said first drum, and the cable on said third drum when passing forwardly from said carriage passing from the opposite one of the upper and lower sides of said third drum from the cable on said first drum, whereby the cable on said second drum can be raised and lowered under power when said cable on said third drum passes either forwardly or rearwardly from said carriage, a first fairlead on the forward end of said carriage for guiding the cable forwardly of the first drum and carriage, a second fairlead on the forward end of said carriage vertically separated from said first fairlead for guiding a cable forwardly from said third drum and carriage without conflict with said first drum and its cable, and a third fairlead on the rear end of said carriage for guiding a cable rearwardly from said third drum and carriage.

2. A carriage according to claim 1 wherein said three transverse shafts are spaced apart horizontally as well as vertically on said carriage.

3. A carriage according to claim 1 wherein said interconnecting means comprises endless flexible drive means interconnecting said three drums.

4. A carriage according to claim 3 wherein said drum brake means comprises a single brake means applied to only one of said three drums.

5. A carriage according to claim 1 including fluid-operated cable clamp-operating means and fluid-operated drum brake-operating means on said carriage and radio receiver means on said carriage for controlling the operation of said brake and clamp-operating means from a radio transmitter remote from said carriage.

6. A carriage according to claim 5 wherein said brake-operating means and clamp-operating means include means for coordinating the operation of said brake and clamp-operating means such that said brake means is applied when said clamp means is released and said clamp means is applied when said brake means is released.

7. A carriage according to claim 1 wherein said shaft means comprises three separate transverse shafts each mounting a different one of said three drums, said transverse shafts and drums being arranged on said carriage such that a cable can extend from said second drum vertically downwardly from said carriage without conflicting with the other two drums and their cables.

8. A carriage according to claim 7 including a fourth fairlead on said carriage for guiding said cable from said second drum, said fourth fairlead being offset rearwardly from a vertical plane extending through the axis of rotation of said second drum and being tilted at an inclination upwardly and rearwardly from the lowermost extremity of said fourth fairlead.

9. A carriage according to claim 1 including means providing a drive reduction from said first drum to said second drum such that an applied tensile force applied to a cable on said first drum causes rotation of said drums in a direction to take in cable on said second drum when a load-induced tensile force on the cable of said second drum is greater than said applied tensile force on the cable of said first drum.

* * * * *